US009177029B1

(12) United States Patent
Chau et al.

(10) Patent No.: US 9,177,029 B1
(45) Date of Patent: Nov. 3, 2015

(54) DETERMINING ACTIVITY IMPORTANCE TO A USER

(75) Inventors: Stephen Chau, Palo Alto, CA (US); Andrew T. Szybalski, San Francisco, CA (US); Stephane Lafon, Sunnyvale, CA (US); Andrea Lynn Frome, Berkeley, CA (US); Jerry Howard Morrison, Mountain View, CA (US); Derek Prothro, San Mateo, CA (US); Huy Nguyen, San Jose, CA (US)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 13/333,991

(22) Filed: Dec. 21, 2011

Related U.S. Application Data

(60) Provisional application No. 61/425,706, filed on Dec. 21, 2010.

(51) Int. Cl.
*G06F 17/30* (2006.01)

(52) U.S. Cl.
CPC ...... *G06F 17/3053* (2013.01); *G06F 17/30663* (2013.01)

(58) Field of Classification Search
CPC ............... G06F 11/34; G06F 11/3048; G06F 2203/011; G06F 19/20; G06F 17/3053; G06F 17/30616; G06F 17/30663
USPC ............ 707/748, 737, 728, 999.201
See application file for complete search history.

(56) References Cited

U.S. PATENT DOCUMENTS

| | | | | |
|---|---|---|---|---|
| 5,621,903 A * | 4/1997 | Luciw et al. | ................... | 715/708 |
| 2003/0046401 A1 * | 3/2003 | Abbott et al. | ................. | 709/228 |
| 2004/0019603 A1 * | 1/2004 | Haigh et al. | ................... | 707/102 |
| 2008/0281901 A1 * | 11/2008 | Lusher et al. | ................. | 709/202 |
| 2008/0301188 A1 * | 12/2008 | O'Hara | ....................... | 707/104.1 |
| 2009/0077000 A1 * | 3/2009 | Begole et al. | .................... | 706/54 |
| 2009/0106227 A1 * | 4/2009 | Davis | ................................ | 707/5 |
| 2009/0119293 A1 * | 5/2009 | Li et al. | ............................. | 707/7 |
| 2009/0182736 A1 * | 7/2009 | Ghatak | ............................. | 707/5 |
| 2010/0082376 A1 * | 4/2010 | Levitt | ................................ | 705/7 |
| 2010/0325111 A1 * | 12/2010 | Aravamudan et al. | ......... | 707/737 |
| 2010/0331146 A1 * | 12/2010 | Kil | ...................................... | 482/8 |
| 2011/0145823 A1 * | 6/2011 | Rowe et al. | ................... | 718/100 |
| 2011/0276565 A1 * | 11/2011 | Zheng et al. | ................... | 707/724 |
| 2012/0016875 A1 * | 1/2012 | Jin et al. | ......................... | 707/734 |
| 2012/0041767 A1 * | 2/2012 | Hoffman et al. | ................ | 705/1.1 |
| 2012/0072940 A1 * | 3/2012 | Fuhrer | ............................. | 725/13 |

* cited by examiner

*Primary Examiner* — Mohammed R Uddin
(74) *Attorney, Agent, or Firm* — McDermott Will & Emery LLP

(57) ABSTRACT

Configurations of an activity assistant processing system are disclosed that provides users with dynamically-selected activities that are intelligently tailored to a user. The subject technology accesses an index of activities. A score is then determined for each particular activity in the index of activities. The score is based on plurality of signals associated with user-specific parameters and global parameters to determine the quantitative importance of a particular activity. The subject technology identifies a subset of activities within the index of activities using the activity assistant processing system in which the subset includes at least one activity with a corresponding score that is greater than or equal to a decision threshold for the at least one activity. At least a portion of the subset of activities is then ranked based on the quantitative importance of the particular activity using the activity assistant processing system.

23 Claims, 6 Drawing Sheets

DETERMINING ACTIVITY IMPORTANCE TO A USER

CROSS-REFERENCE TO RELATED APPLICATIONS

The present application claims the benefit of priority under 35 U.S.C. §119 from U.S. Provisional Patent Application Ser. No. 61/425,706 entitled "QUANTIFICATION AND RANKING OF ACTIVITY IMPORTANCE TO A USER," filed on Dec. 21, 2010, the disclosure of which is hereby incorporated by reference in its entirety for all purposes.

BACKGROUND

Various technologies can be utilized to electronically exchange information between users. For example, computers, telephones, and personal digital assistants (PDAs) can be used to exchange content over communication networks including the Internet. The content exchanged between such devices can include web pages that, in turn, can include text, video data, audio data and/or other types of data.

SUMMARY

Disclosed herein are methods and systems that relate to an "activity assistant" that provides users with dynamically-selected "activities" that are intelligently tailored to the user's world. Accordingly, an example activity assistant customizes a display of a user's activity list, suggest activities, and customize activity search results based on personalized factors such as the user's interests, current mood, and intent. Furthermore, an example activity assistant is also capable of intelligently varying the behavior of a given activity from one user to another, depending upon the characteristics of a given user. For example, the activity assistant scores an activity based not only on the characteristics of the activity itself, but also based on data that is indicative of the user's "context" (e.g., the user's, interests, intents, moods, experiences, etc.).

According to an example implementation, a user interface is provided that allows for intuitive user interaction with activities via the activity assistant. This user interface is generally referred to herein as an "activity assistant user interface". A user typically accesses the activity assistant UI by logging in to a user's activity-assistant account. According to an example implementation, the activity assistant UI displays graphical and textual representations of activities to a user in a logical manner that varies according to the interests, intents, and moods of the user. Via the activity assistant UI, the user views activities the user has added to a personal "activity list," view suggested activities, create and add new activities to their activity list, and/or add/delete existing activities (i.e. those created by other users) to/from their activity list, among other functions.

In one aspect, an example method performed by a computing device involves: (i) accessing, by an activity assistant processing system, an index of activities stored on tangible, non-transitory computer readable media, using the activity assistant processing system; (ii) for each particular activity in the index of activities, determining, by the activity assistant processing system, a score for the particular activity in which the score is based on one or more signals associated with at least one of a plurality of parameters comprising user-specific parameters and global parameters; (iii) identifying, by the activity assistant processing system, a subset of activities within the index of activities using the activity assistant processing system in which the subset includes at least one activity with a corresponding score that is greater than or equal to a decision threshold for the at least one activity in which the decision threshold is based on the at least one activity's corresponding score; (iv) ranking, by the activity assistant processing system, at least a portion of the subset of activities based on the scores of the activities relative to one another; and (v) generating a display of the analyzed ranked portion of the subset of activities of the particular activity for a particular user.

In another aspect, an example activity-assistant system includes: (i) a non-transitory computer-readable medium comprising an index of activities; (ii) program instructions stored on the non-transitory computer-readable medium and executable by an activity assistant processing system to: (a) access an index of activities stored on tangible, non-transitory computer readable media, using the activity assistant processing system; (b) for each particular activity in the index of activities, determine a score for the particular activity in which the score is based on plurality of signals associated with at least one of a plurality of parameters comprising user-specific parameters and global parameters; (c) identify a subset of activities within the index of activities in which the subset includes at least one activity with a corresponding score that is greater than or equal to a decision threshold for the at least one activity, and in which the decision threshold is based on the at least one activity's corresponding score; (v) rank at least a portion of the subset of activities based on the scores of the activities relative to one another; and (vii) in which the one or more computing devices are further configured to generate a display of the analyzed ranked portion of the subset of activities for a particular user.

In yet another aspect, an article of manufacture including a non-transitory computer-readable medium is disclosed. Program instructions are stored thereon that, upon execution by a computing device, cause the computing device to perform operations comprising: (i) instructions for creating an index of activities at an activity assistant processing system; (ii) instructions for accessing an index of activities stored on tangible, non-transitory computer readable media, using the activity assistant processing system; (iii) for each particular activity in the index of activities, instructions for determining a score for the particular activity in which the score is based on plurality of signals associated with user-specific parameters and global parameters to determine the quantitative importance of a particular activity, using the activity assistant processing system; (iv) instructions for identifying a subset of activities within the index of activities using the activity assistant processing system in which the subset includes at least one activity with a corresponding score that is greater than or equal to a decision threshold for the at least one activity in which the decision threshold is based on the at least one activity's corresponding score; (v) instructions for ranking at least a portion of the subset of activities based on the quantitative importance of the particular activity using the activity assistant processing system; and (vii) instructions for generating a display of the analyzed ranked portion of the subset of activities and quantitative importance of the particular activity for a particular user using the activity assistant processing system.

In an example implementation, an "activity assistant" is provided, which is configured to evaluate the relative importance of activities to a particular user so that activities can be presented on the activity assistant user interface in a logical manner. In particular, the activity assistant may score an activity based not only on the characteristics of the activity itself, but also based on data that is indicative of the user's "context" (e.g., the user's, interests, intents, moods, experiences, associations with other users, etc.). With the support of the activity assistant, the activity assistant user interface may therefore provide users with a dynamic and flexible mechanism for deciding what activities they might enjoy, and how they would like to spend their time.

DETAILED DESCRIPTION

Figure 1:
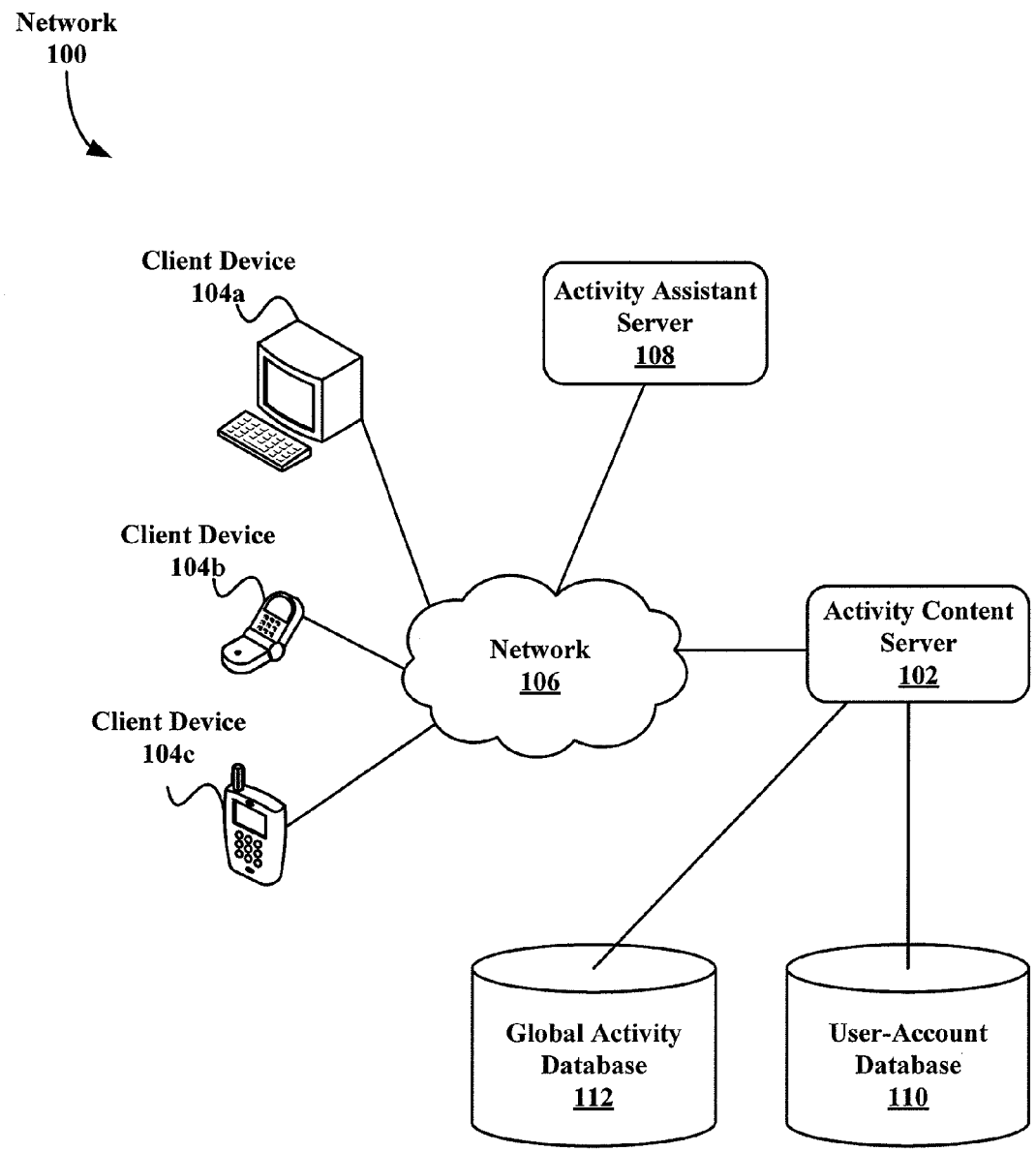
FIG. 1 depicts a network in accordance with an example implementation.

The following detailed description describes various features and functions of the example systems, devices, and methods with reference to the accompanying figures. It should be understood that the word "example" is used herein to mean "serving as an example, instance, or illustration." Any implementation described herein as "example" is not necessarily to be construed as preferred or advantageous over other implementations. In the figures, similar symbols typically identify similar components, unless context dictates otherwise. The illustrative implementations described in the detailed description, figures, and claims are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

An "activity", as used herein, can be data construct describing a thing to do, which a user can associate with a user's "activity-assistant account." In an example implementation, an activity is defined at least in part by one or more singular, global activity parameters. For example, global parameters for a given activity include: (a) a title or text description (e.g., "get brunch at Boogaloo's restaurant"), (b) data indicating the location that is associated with the activity (e.g., a latitude/longitude and/or a street address of Boogaloo's restaurant), (c) data indicating one or more user "moods" that are indicative of the activity being more or less well-suited for a given user at a given point in time (e.g., "fun", "social", "cerebral", "productive", "ambitious", etc.), (d) data indicating time constraints on the activity (e.g., the hours that Boogaloo's restaurant is open and/or the hours during which Boogaloo's restaurant serves brunch), and (e) any other data that is directly or indirectly interpreted to affect the importance of a given activity to a given user.

Generally, an activity is a user-defined construct, and thus the global parameters that define each activity may vary. In particular, a given activity includes all of the above-mentioned global activity parameters, a subset of the above-mentioned parameters, or none of the above-mentioned parameters. For example, a user creates an activity that is not tied to any particular location (e.g., "do homework for math class"), and thus choose not to provide a location. Furthermore, as activities are flexible and dynamic constructs, it should be understood that the above-mentioned examples of global parameters are not limiting. It is also possible that an activity be generated by a computing system without any initial user input (or alternatively, generated based on some user-provided input).

Once an activity is created, its global parameters are applied to all users who add the activity or become associated with the activity. Thus, in effect, there is a single copy of each activity and its global parameters that is common to all those users. It should be understood, however, that global parameters can still be flexible and dynamic, and may change over time in relation to the activity. For example, a "popularity" parameter is defined for an activity that is updated on an ongoing basis to reflect the number of users that have added the activity.

To further allow for customization of activities to a particular user, "user-specific" parameters, which vary between users, can be defined for an activity. Accordingly, while the global parameters of an activity are the same for all users, each user that adds an activity can customize their user-specific parameters for the activity. For instance, user-specific parameters can be used to specify: (a) plans regarding the activity (e.g., "I want to do it", "I want to do it again, but not for a few weeks," "I must do it before December 25," "I never want to do it again," etc.), (b) the user's history regarding that activity (e.g., I went there with Lauren on November 4 and again with Ryan on November 28), (c) personal time constraints based on user preferences (e.g., preference of brunch early on Sunday so that time is available to digest before yoga class at noon), and/or (d) any other personal preferences that overrides or modifies the global parameters (e.g., "I like to go to Boogaloo's restaurant when I'm sad because it cheers me up," "I like to go to Boogaloo's restaurant when I have friends in town," etc.).

In a further aspect, an activity is designated as a "public" or "private" activity. Depending on how a given activity is defined, this designation can be made by setting a global parameter when the activity is created (and thus apply to all users who add the activity), and/or be made via a user-specific parameter that is settable by each user who adds an activity.

An activity that is designated as "public" via a global parameter is viewable (and thus addable) to all users, whereas an activity that is designated as "private" via a global parameter is only be viewable to the creator of the activity. In an example implementation, a global parameter is set to designate an activity as a "private shared" activity, in which case the activity is only viewable by the author and the users the author specifies. Further, the fact that a given activity is designated as "public," "private," or "private shared" via a global parameter can be interpreted as a signal relevant to the importance of the activity to a certain user.

When an activity is designated as "private" via a user-specific parameter, other users are generally not notified that the user has added the activity. And when an activity is designated as "public" via a user-specific parameter, other users may be notified and/or be able to see that the user has added the activity. Further, when an activity is designated as "public" via a user-specific parameter, the user can define which other users can view and/or which other users should be notified that they have added the activity.

In an example implementation, an "activity assistant" is provided, which is configured to evaluate the relative importance of activities to a particular user so that activities can be presented on the activity assistant user interface in a logical manner. In particular, the activity assistant may score an activity based not only on the characteristics of the activity itself, but also based on data that is indicative of the user's "context" (e.g., the user's, interests, intents, moods, experiences, associations with other users, etc.). With the support of the activity assistant, the activity assistant user interface may therefore provide users with a dynamic and flexible mechanism for deciding what activities they might enjoy, and how they would like to spend their time.

In order to quantify the importance of a particular activity for a particular user, the activity assistant identifies and/or determines any number of "signals" that is directly or indirectly relevant to the importance of an activity to the particular user. From the perspective of the activity assistant, signals can take the form of information provided by global parameters and user-specific parameters taken individually or information determined by evaluating interactions between global parameters, user-specific parameters, and/or other data sources. The activity assistant evaluates the signals for a particular combination of user and activity, and based on the signals, quantify the importance of the particular activity for the particular user (e.g., by assigning a "score" to the activity).

To provide some examples of such signals, they include but are not limited to: the level of similarity between user's mood and activity mood, the level of similarity between the user's context (as indicated by user-specific signals and/or user-specific parameters indicating, for example, whether the user is on a desktop computer/mobile phone, on-line/off-line, talking on the phone, driving, walking, etc.) and corresponding activity context requirements and/or restrictions (as indicated by global parameters of the activity), a distance between the user's current detected (or indicated) location and the activity location (if available), the appropriateness of the activity for the current weather conditions at the user's current or indicated location and/or the current weather conditions at the activity's indicated location (e.g., rainy, sunny, snowy, etc.), a user-designated priority for the activity, a user-designated due date (or next due date, if recurring), a user's snooze history or pattern for the activity, an amount of time required for the activity, a progress or status of the activity (done, active, in-progress, etc.), ownership of the activity (e.g., whether the owner is the particular user in question or another user), whether the user received an invitation to the activity or just a notice that the activity exists (e.g., a "heads-up"), a popularity of the activity (e.g., number of comments on an activity, or the number of people who have commented, copied, liked, shared, done, or followed the activity), a similarity between a user query string and the activity text (for search/suggest), a similarity between a user query string and the names or e-mails of other users associated with the activity (for search/suggest), a similarity between user query string and activity comment text (for search/suggest), and whether the user indicated another user with whom to participate in the activity with. Other possibilities exist as well.

Supported with this intelligence from the activity assistant, the activity assistant user interface presents activities that a particular user has associated with their account in a logical order that is based at least in part upon the relative importance of the activities to the user. In particular, the activity assistant evaluates the signals for each activity in a user's activity list (i.e., each activity that has been added by the user) and assign a score to the activity. The activity assistant can then rank the activities in the user's activity list according to their respectively determined score, and relay this information to the activity assistant user interface so that it can adjust the displayed activity list accordingly.

Further, the intelligence of the activity assistant is utilized to provide "suggested" activities that are tailored to the particular user's preferences, tendencies, location, time table, associated other users, and/or mood at a given point in time. In particular, the activity assistant initiates an activity search that takes into account the scores of activities when ranking the search results, and these search results are presented to the user via the activity assistant user interface. In a similar manner, the activity assistant supports an "activity search" feature of the activity assistant user interface. This feature allows the user to enter text and initiate an activity search on the text, the results of which factor in the relative scores of activities as assessed by the activity assistant.

According to an example implementation, a user interface is provided that allows for intuitive user interaction with such activities. This user interface can be generally referred to herein as an "activity assistant user interface". A user typically accesses the activity assistant user interface by logging in to a user's activity-assistant account. According to an example implementation, the activity assistant user interface displays graphical representations of activities to a user in a logical manner that varies according to the interests, intents, associations with other users, and moods of the user. Via the activity assistant user interface, the user views activities they have added to a personal "activity list," view suggested activities, create and add new activities to their activity list, and/or add/delete existing activities (e.g., those created by other users) to/from their activity list, among other functions.

Turning to the figures, FIG. 1 depicts a network in accordance with an example implementation. In network 100, activity assistant server 108 and possibly activity content server 102 are configured to communicate, via a network 106, with client devices 104*a*, 104*b*, and 104*c*. As shown in FIG. 1, client devices can include a personal computer 104*a*, a telephone 104*b*, and a smart-phone 104*c*. More generally, the client devices 104*a*, 104*b*, and 104*c* (or any additional client devices) can be any sort of computing device, such as an ordinary laptop computer, desktop computer, network terminal, wireless communication device (e.g., a cell phone or smart phone), and so on.

The network 106 can correspond to a local area network, a wide area network, a corporate intranet, the public Internet, combinations thereof, or any other type of network(s) configured to provide communication between networked computing devices. Activity content server 102 can provide content to client device 104*a*-104*c* and/or activity assistant server 108. The content can include, but is not limited to, web pages, hypertext, scripts, binary data such as compiled software, images, audio, and/or video. The content can include compressed and/or uncompressed content and/or encrypted and/or unencrypted content. Other types of content are possible as well.

In an alternative arrangement, activity assistant server 108 and activity content server 102 can be co-located and/or combined as a common server. Further, it also possible that activity assistant server 108 and/or activity content server 102 can be accessible via a network separate from the network 106. Yet further, although FIG. 1 only shows three client devices, activity assistant server 108 and/or activity content server 102 can serve any number of client devices (from a single client device to hundreds, thousands, or even more client devices).

Global activity database 112 typically includes activity data that defines a plurality of activities. In particular, the activity data for each activity includes one or more global activity parameters that collectively define the global context for the activity. Further, user-account database 110 includes per-account data for users' activity accounts. This per-account data includes, for a given one of the accounts, data indicating user-specific parameters and signals. Further, for a given activity account, the per-account data includes an indication of which activities, if any, are associated with the account (e.g., the activities that a user has added to their activity list).

According to an example implementation, activity assistant server 108 embodies the "activity assistant" and thus is configured to provide the activity-assistant functionality described herein. In particular, activity assistant server 108 is configured to identify signals relating to the importance of a particular activity to a particular user (e.g., relating to a given user-activity pair), so that activities can be logically displayed to a user, suggested to a user, and/or searched for a user via an activity assistant user interface.

In some implementations, activity-assistant functionality described herein also can be performed by software on the device such as, but not limited to, devices 104a, 104b, and 104c as shown in FIG. 1. For example, the client software running on the device such as, but not limited to, devices 104a, 104b, and 104c as shown in FIG. 1 can perform all or some portion of the ranking functionality and/or provide more advanced assistance, e.g. by providing a latitude/longitude and/or map for an address entered by the user via an activity assistant user interface and/or by directly communicating with an activity assistant processing system.

The activity assistant server 108 acquires the data from which signals are determined, and/or data directly providing signals, from a number of different data sources. For example, activity content server 102 provides activity assistant server 108 with access to global activity database 112 and user-account database 110. Thus, when evaluating the importance of a particular activity to a particular user, activity assistant server 108 retrieves the global parameters of the activity from global activity database 112, as well as user-specific parameters from user-account database 110.

Figure 2A:
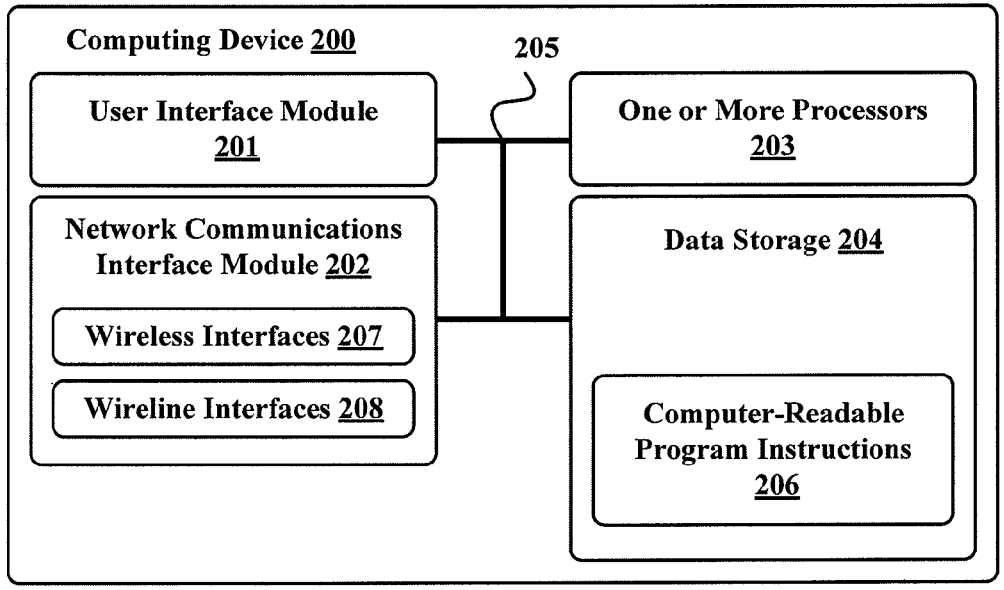
FIG. 2A is a block diagram of a computing device in accordance with an example implementation.

FIG. 2A is a block diagram of a computing device in accordance with an example implementation. Computing device 200 can be configured to perform one or more functions of client devices 104a, 104b, and 104c, activity assistant server 108, and/or activity content server 102. The computing device 200 can include a user interface module 201, a network-communication interface module 202, one or more processors 203, and/or data storage 204, all of which can be linked together via a system bus, network, or other connection mechanism 205.

The user interface module 201 can be operable to send data to and/or receive data from external user input/output devices. For example, the user interface module 201 can be configured to send/receive data to/from user input devices such as a keyboard, a keypad, a touch screen, a computer mouse, a track ball, a joystick, a microphone, and/or other similar devices, now known or later developed. The user interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 can also be configured to receive audible input(s) via the microphone (or similar audio input device) and/or generate audible output(s), such as a speaker, speaker jack, audio output port, audio output device, earphones, and/or other similar devices, now known or later developed.

The network-communications interface module 202 can include one or more wireless interfaces 207 and/or wireline interfaces 208 that are configurable to communicate via a network, such as the network 106 shown in FIG. 1. The wireless interfaces 207 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 208 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some implementations, the network communications interface module 202 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 203 can include one or more general purpose processors and/or one or more special purpose processors (e.g., digital signal processors, application specific integrated circuits, etc.). The one or more processors 203 can be configured to execute computer-readable program instructions 206 that are contained in the data storage 204 and/or other instructions as described herein.

The data storage 204 can include one or more computer-readable storage media that can be read or accessed by at least one of the processors 203. The one or more computer-readable storage media can include volatile and/or non-volatile storage components, such as optical, magnetic, organic or other memory or disc storage, which can be integrated in whole or in part with at least one of the one or more processors 203. In some implementations, the data storage 204 can be implemented using a single physical device (e.g., one optical, magnetic, organic or other memory or disc storage unit), while in other implementations, the data storage 204 can be implemented using two or more physical devices.

Computer-readable storage media associated with data storage 204 and/or other computer-readable media described herein can also include non-transitory computer-readable media such as computer-readable media that stores data for short periods of time like register memory, processor cache, and random access memory (RAM). Computer-readable storage media associated with data storage 204 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 204 and/or other computer-readable media described herein can also be any other volatile or non-volatile storage systems. Computer-readable storage media associated with data storage 204 and/or other computer-readable media described herein can be considered computer readable storage media for example, or a tangible storage device.

The data storage 204 can include computer-readable program instructions 206 and perhaps additional data. In some implementations, the data storage 204 can additionally include storage required to perform at least part of the herein-described techniques, methods, and/or at least part of the functionality of the herein-described devices and networks.

Figure 2B:
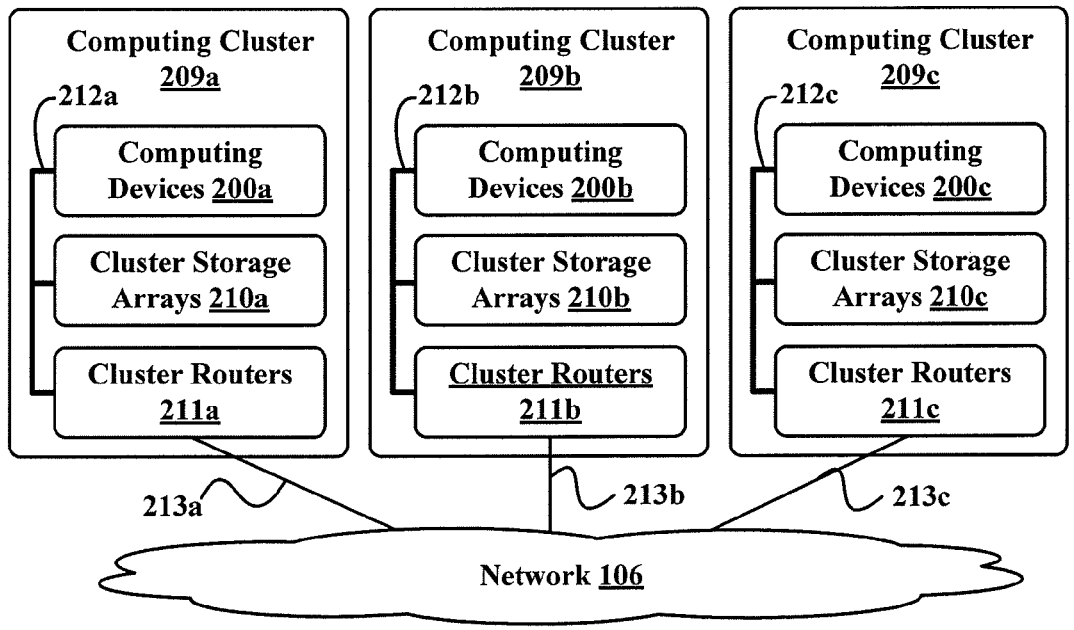
FIG. 2B depicts a network with computing clusters in accordance with an example implementation.

FIG. 2B depicts a network with computing clusters in accordance with an example implementation. In FIG. 2B, functions of activity assistant server 108 and/or activity content server 110 can be distributed among three computing clusters 209a, 209b, and 209c. The computing cluster 209a can include one or more computing devices 200a, cluster storage arrays 210a, and cluster routers 211a connected by local cluster network 212a. Similarly, computing cluster 209b can include one or more computing devices 200b, cluster storage arrays 210b, and cluster routers 211b connected by local cluster network 212b. Likewise, computing cluster 209c can include one or more computing devices 200c, cluster storage arrays 210c, and cluster routers 211c connected by a local cluster network 212c.

In some implementations, each of computing clusters 209a, 209b, and 209c can have an equal number of computing devices, an equal number of cluster storage arrays, and an equal number of cluster routers. In other implementations, however, some or all of computing clusters 209a, 209b, and 209c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of activity content server 102. In one implementation, the various functionalities of activity content server 102 can be distributed among one or more of the computing devices 200a. For example, some of these computing devices can be configured to provide part or all of a first set of content while the remaining computing devices can provide part or all of a second set of content. Still other computing devices of the computing cluster 209a can be configured to communicate with activity assistant server 108. Computing devices 200b and 200c in computing clusters 209b and 209c can be configured the same or similarly to the computing devices 200a in computing cluster 209a.

On the other hand, in some implementations, computing devices 200a, 200b, and 200c each can be configured to perform different functions. For example, computing devices 200a and 200b can be configured to perform one or more functions of activity content server 102, and the computing devices 200c can be configured to perform one or more functions of activity assistant server 108.

Cluster storage arrays 210a, 210b, and 210c of computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of activity assistant server 108 and/or activity content server 102 can be distributed across computing devices 200a, 200b, and 200c of respective computing clusters 209a, 209b, and 209c, various active portions and/or backup/redundant portions of these components can be distributed across cluster storage arrays 210a, 210b, and 210c. For example, some cluster storage arrays can be configured to store data for activity assistant server 108, while other cluster storage arrays can store data for activity content server 102. Additionally, some cluster storage arrays can be configured to store backup versions of data stored in other cluster storage arrays.

The cluster routers 211a, 211b, and 211c in the computing clusters 209a, 209b, and 209c can include networking equipment configured to provide internal and external communications for the computing clusters. For example, the cluster routers 211a in the computing cluster 209a can include one or more internet switching and/or routing devices configured to provide (i) local area network communications between the computing devices 200a and the cluster storage arrays 201a via the local cluster network 212a, and/or (ii) wide area network communications between the computing cluster 209a and the computing clusters 209b and 209c via the wide area network connection 213a to the network 106. The cluster routers 211b and 211c can include network equipment similar to the cluster routers 211a, and the cluster routers 211b and 211c can perform similar networking functions for the computing clusters 209b and 209b that the cluster routers 211a perform for the computing cluster 209a.

In some implementations, computing tasks and stored data associated with activity assistant server 108 and/or activity content server 102 can be distributed across the computing devices 200a, 200b, and 200c based at least in part on the processing requirements for functions of activity assistant server 108 and/or user account server 102, the processing capabilities of the computing devices 200a, 200b, and 200c, the latency of the local cluster networks 212a, 212b, and 212c and/or of the wide area network connections 213a, 213b, and 213c, and/or other factors that can contribute to the cost, speed, fault-tolerance, resiliency, efficiency, and/or other design goals of the overall system architecture.

Additionally, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of the local cluster networks 212a, 212b, 212c, the latency, throughput, and cost of the wide area network connections 213a, 213b, and 213c, and/or other factors that can contribute to the cost, speed, fault-tolerance, resiliency, efficiency and/or other design goals of the system architecture.

In some implementations, the disclosed methods are implemented as computer program instructions encoded on a computer-readable media in a machine-readable format. In some example, an example computer program product includes a computer program for executing a computer process on a computing device, arranged according to at least some implementations presented herein. In one implementation, the example computer program product is provided using a signal bearing medium. The signal bearing medium includes one or more programming instructions that, when executed by one or more processors provides functionality or portions of the functionality described above with respect to any of FIGS. 1-5. Thus, for example, referring to the implementations shown in blocks 501-506 of FIG. 5 are undertaken by one or more instructions associated with the signal bearing medium.

In some examples, the signal bearing medium encompasses a computer-readable medium, such as, but not limited to, a hard disk drive, a Compact Disc (CD), a Digital Video Disk (DVD), a digital tape, memory, etc. In some implementations, the signal bearing medium encompasses a computer recordable medium, such as, but not limited to, memory, read/write (R/W) CDs, R/W DVDs, etc. In some implementations, the signal bearing medium encompasses a communications medium, such as, but not limited to, a digital and/or an analog communication medium (e.g., a fiber optic cable, a waveguide, a wired communications link, a wireless communication link, etc.). Thus, for example, the signal bearing medium is conveyed by a wireless form of the communications medium (e.g., a wireless communications medium conforming with the IEEE 802.11 standard or other transmission protocol).

The one or more programming instructions is, for example, computer executable and/or logic implemented instructions. In some examples, a computing device such as the activity assistant server 108 of FIG. 1 is configured to provide various operations, functions, or actions in response to the programming instructions conveyed to the activity assistant server 108 by one or more of the computer readable medium, the computer recordable medium, and/or the communications medium.

Figure 3A:
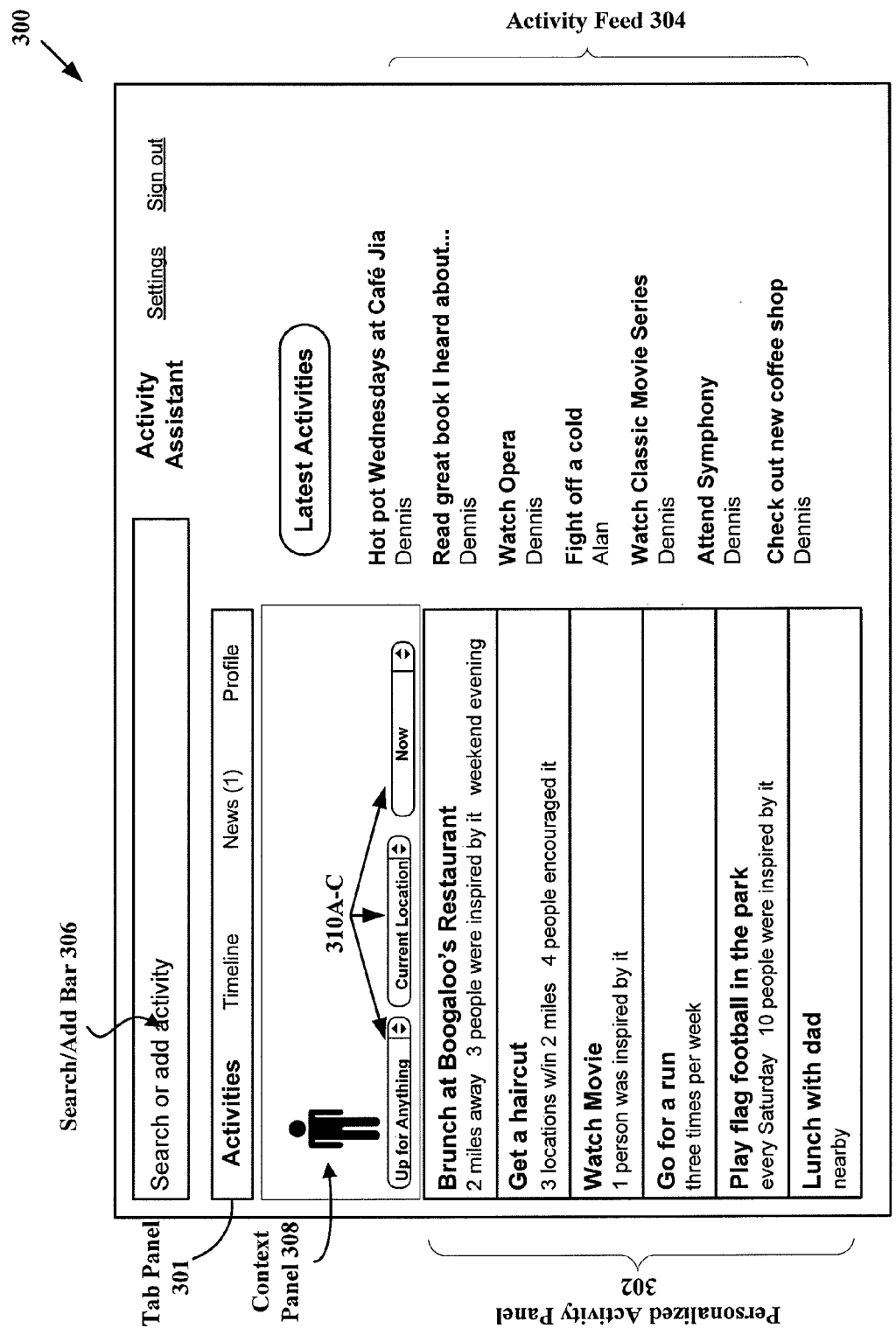
FIG. 3A is a block diagram illustrating features of a user interface, according to an example implementation.

FIG. 3A is a block diagram illustrating features of a user interface, according to an example implementation. In particular, activity-assistant user interface 300 is displayed via a client device once a user has logged in to their activity-assistant account, and allows a user to interact with an activity assistant. While only one screen of the activity-assistant user interface 300 is shown, it should be understood that the activity-assistant user interface includes other screens, which provide additional functionality, without departing from the scope of the subject technology. As shown, activity-assistant user interface 300 includes a personalized activity panel 302, an activity feed 304 that displays activities that have been added, done, and/or recently updated by friends of the user (or members of the user's social graph and/or social network), a search/add bar 306, and a context panel 308. Further, context panel 308 includes a number of input mechanisms 310 A-C via which a user can input context signals.

The tab menu panel 301 acts as a menu selection bar, and determines the content of the remainder of the user interface 300. As shown in FIG. 3A, the Activities tab is currently selected, and as a result, the personalized activity panel 302 and the activity feed 304 are displayed. The Timeline tab includes a time-based ordering of activities. The News tab includes a listing of activities, announcements, and/or actions (e.g., "today your friend did the activity 'watch movie' that you inspired him/her to add") of other users with which the current user is associated. The profile tab allows the current user to modify settings, such as login preferences, display settings, and/or how the current user's information appears to other users (name, privacy settings, etc), among others. In some implementations, a subset of the tabs illustrated in FIG. 3 are provided, and in other implementations, a superset of the tabs are provided.

The context panel 308 provides an interactive mechanism for users to provide context signal data that describes a "user context" (e.g. to provide signals indicative of the user's intent, interest, mood, state-of-mind, experience, perception, associations with other users, etc.). In the illustrated example, input mechanism 310A on the left of context panel 308 allows a user to signal their mood (e.g., "up for anything", "lazy", "productive", "social", etc.). The input mechanism 310B in the center of context panel 308 allows a user to signal a location (e.g., "current location", "home", "work", "stadium", etc.). Further, input mechanism 310C on the right of context panel 308 allows a user to signal a time or timeframe (e.g., "now", "tomorrow", "tonight", "next Wednesday morning", "2:00 AM CST", "9:00 PM EST on Saturday", etc.). Other input mechanisms are possible as well.

While the context information provided via the input mechanisms of the context panel 308 are referred to as "signals" from the user, it should be understood that, programmatically, this information can take the form of user-specific parameters that are associated with the user's activity account. As such, the data provided via input mechanisms 310 A-C can be stored in a user-account database. For example, referring back to FIG. 1, data from input mechanisms 310 A-C are stored as user-specific parameters in user-account database 110. It is also possible that activity assistant server 108 is fed data or pulls data directly from input mechanisms 310 in real-time.

The context signal data acquired from the context panel 308 (e.g., user-specific parameters related to "user context") is combined by the activity assistant (e.g., activity-assistant server 108 and/or activity content server 102) with global parameters of a given activity, other user-specific parameters, and/or data from other sources, in order to derive signals indicative of activity-importance of the given activity to the user. In this context, the "signals" are the information relative to the importance of the activity that is derived from the data (e.g., the user-specific parameters, global parameters, etc.). As such, the activity assistant interprets a user-parameter as a signal in and of itself.

For instance, the user's mood (provided via input mechanism 310A) is interpreted as a signal that makes any number of activities more or less important for the user. As a specific example, if the user's mood is "lazy", the activity "watching a movie" can become more important than it otherwise would be (as global parameters can indicate that "lazy" is a mood associated with the "watching a movie" activity). On the other hand, the activity "go to the gym" can become less important than it otherwise would be (as global parameters of "watching a movie" do not typically include "lazy" as an associated mood, or can in fact indicate that "lazy" is a mood that is likely incompatible with this activity).

The activity assistant also derives more complex signals by evaluating the relationships and/or interactions between user-specific parameters, global parameters, and/or other data items in some configurations. To provide an example, a user provides a "love being outdoors" signal, which is stored in the user's account as a user-specific parameter (note that a user interface input mechanism not shown on the user interface 300, but is contemplated as being available). At a given point in time, the user also has set their mood to "active" via input mechanism 310A, set their location to "current location" via input mechanism 310B, and set their time to "tomorrow afternoon". The activity assistant interprets this data as including a signal that the user would like to do something active tomorrow afternoon at the same place they are currently located.

Further, in some configurations, the activity assistant uses other data sources to determine other relevant signals, such as the weather forecast for the next day at the user's current location or the location that the user will likely be at the next day. Tomorrow afternoon's weather forecast thus is a signal, which can be combined with the signal derived from the user-specific parameters to provide a more-refined signal that, for example, outdoor fitness or sporting activities near the user's location should always be favored over indoor fitness or sporting activities near the user's location, unless the tomorrow afternoon's forecast is for rain, in which case the amount by which outdoor activities are favored over indoor activities are reduced (or indoor activities may actually be favored). For instance, combining all of this information, the activity assistant can increase the importance of active outdoor activities (e.g., "go for a run", "play flag football", etc.) to a greater extent when the forecast is for sunny weather, than when the forecast is for rain or snow.

The activity assistant applies signal-based techniques, such as those described herein, to assess activity-importance for a number of activities and the importance of these activities relative to one another in some configurations. This technique is employed to provide the user with various functions that are tailored to the user's context.

For example, personalized activity panel 302 displays intelligently selected and ordered activities from a pool of activities including the activities a user has added to their account and suggested activities that have been selected for a user. For example, a number of suggested activities are determined based on factors such as user preferences, signals from the context panel, global parameters of potential activities, activities that have been added and/or done by friends of the user, and/or activities that have been added and/or done by the user in the past, among others. These suggested activities are then combined with the activities a user has already added to create a pool of potential activities for the personalized activity panel 302. Then, to determine which specific activities to display in personalized activity panel 302, the activity assistant quantifies the importance of each activity (e.g., by evaluating signals for each activity), so that the activities that are most important to the user are displayed.

Note that personalized activity panel 302 visually differentiates between activities that a user has already added to their account, and suggested activities in some configurations. For example, the "Watch Movie" activity is displayed with a dark background and white text to indicate that it is a suggested activity (and that the user may thus wish to add it), whereas the other activities listed in personalized activity panel 302 all have a white background with black text, thus indicating that the user has already added these activities.

Further, the evaluation of importance are also applied in the process of determining which activities should be displayed in the activity feed 304 (and possibly the order in which those activities are displayed) in some configurations. In particular, a certain number of the most recently-added and updated activities are evaluated based on signals such as those described above, and the most important of the recent activities are displayed (possibly in the order of importance. Alternatively, it should be understood that activity feed 304 simply displays activities in a time-wise manner as they are added/updated/completed, without adjusting based on the user's context. In a similar manner, search results (not shown) for an activity search via search/add bar 306 are displayed based at least in part on importance of the activities located in the search, or be displayed in an order according to one of the many well-known search techniques.

Figure 3B:
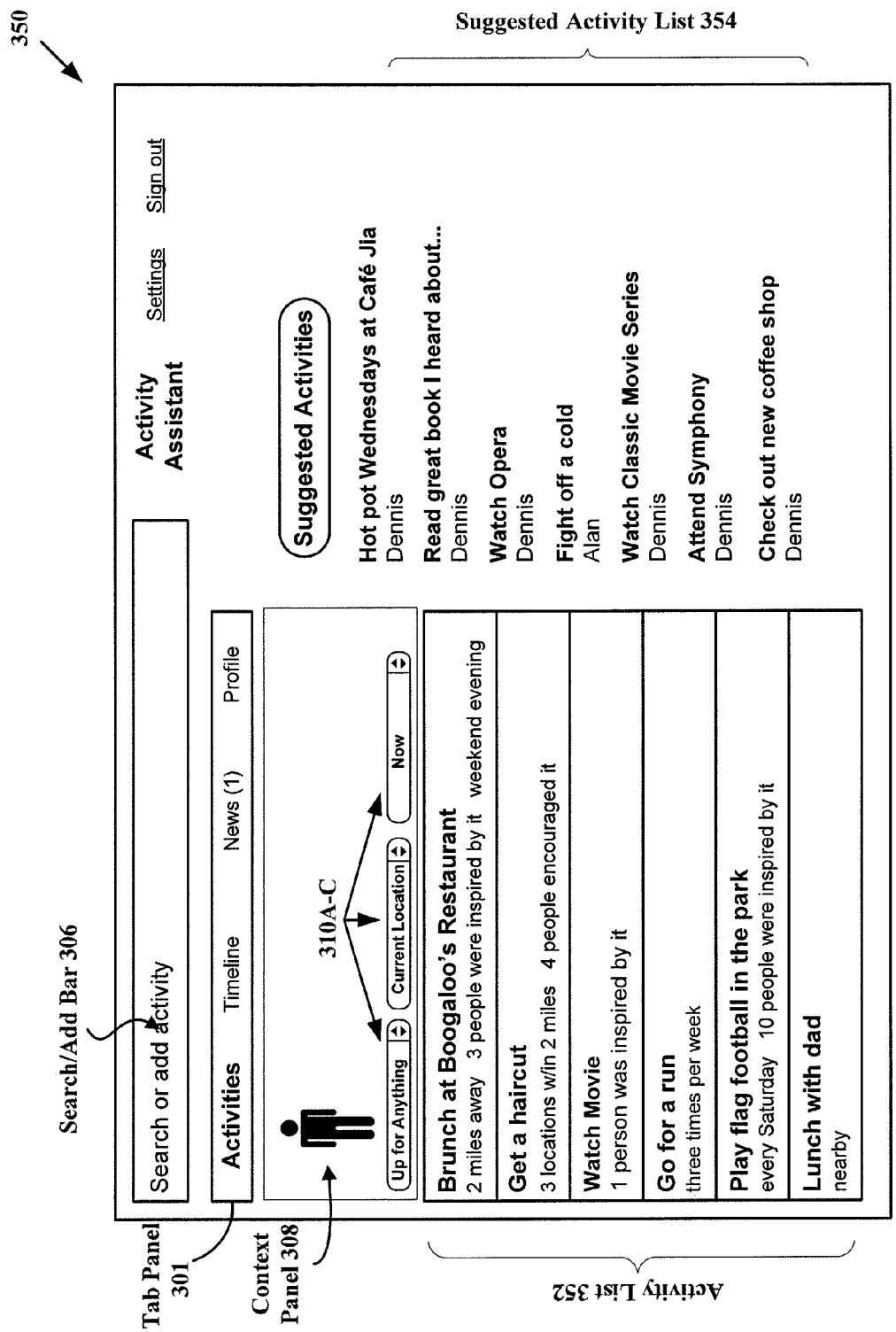
FIG. 3B is a block diagram illustrating features of a user interface, according to another implementation.

FIG. 3B is another block diagram illustrating features of a user interface, according to an example implementation. In particular, FIG. 3B illustrates an alternative activity-assistant user interface 350, which are displayed via a client device once a user has logged in to their activity-assistant account. Activity-assistant user interface 350 includes some of the same UI elements as activity-assistant user interface 300 of FIG. 3A (e.g., search/add bar 306 and context panel 308 including a number of input mechanisms 310A-C). However, activity assistant user interface 350 includes an activity list 352 and a suggested activity list 354.

In this implementation, activity list 352 includes only activities that a user has added to their account. Thus, by evaluating signals for each activity a user has added to their account, the activity assistant can determine which activities should be displayed in activity list 352 (and the order in which those activities should be displayed).

Furthermore, suggested activity list 354 displays only suggested activities (which have not yet been added by the user.) Accordingly, the importance of specific activities can also be a factor in the process of determining which activities should be displayed in the suggested activity list 354 (and the order of those activities).

Figure 4:
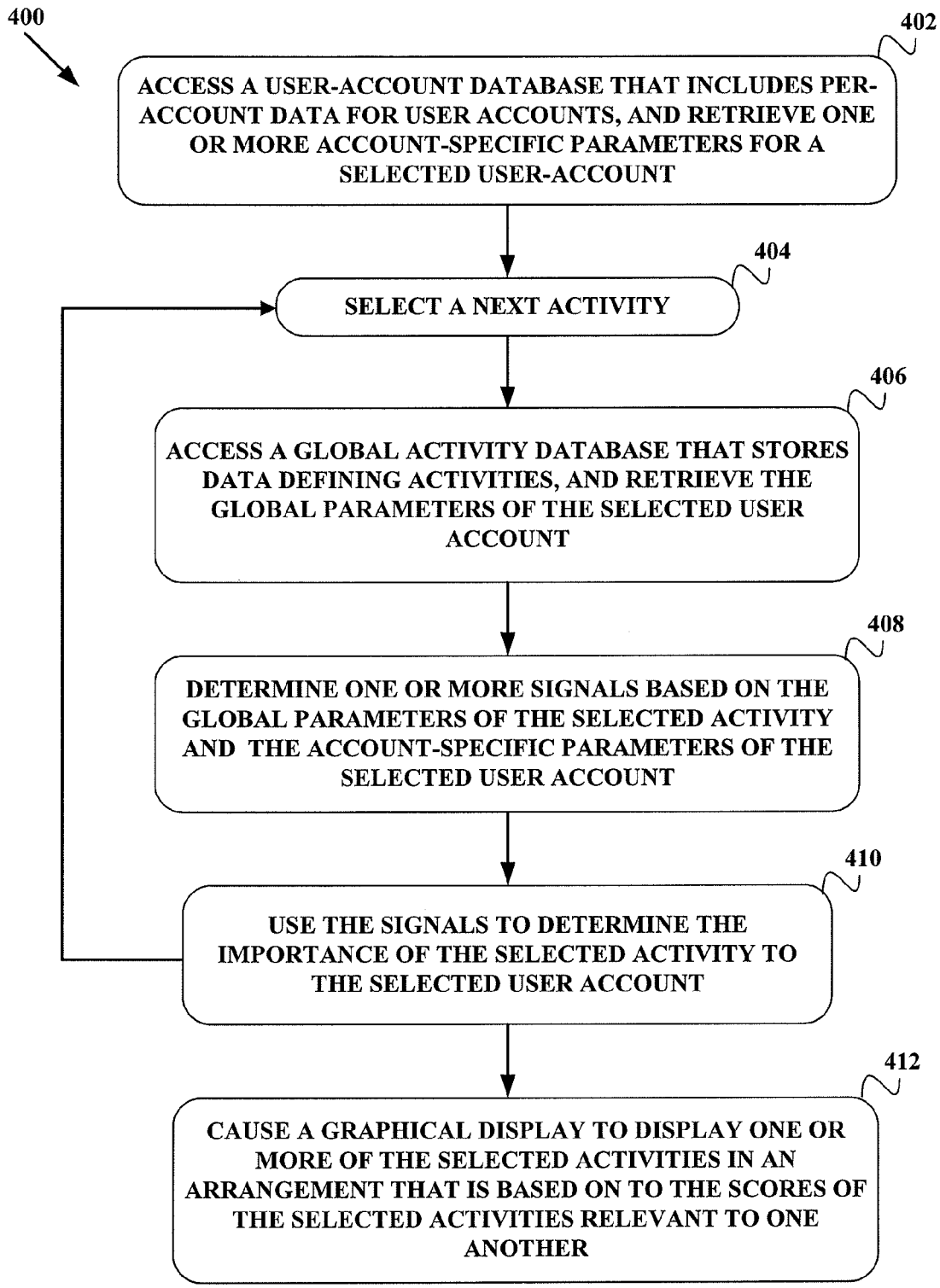
FIG. 4 is flow chart illustrating a method according to an example implementation.
Figure 5:
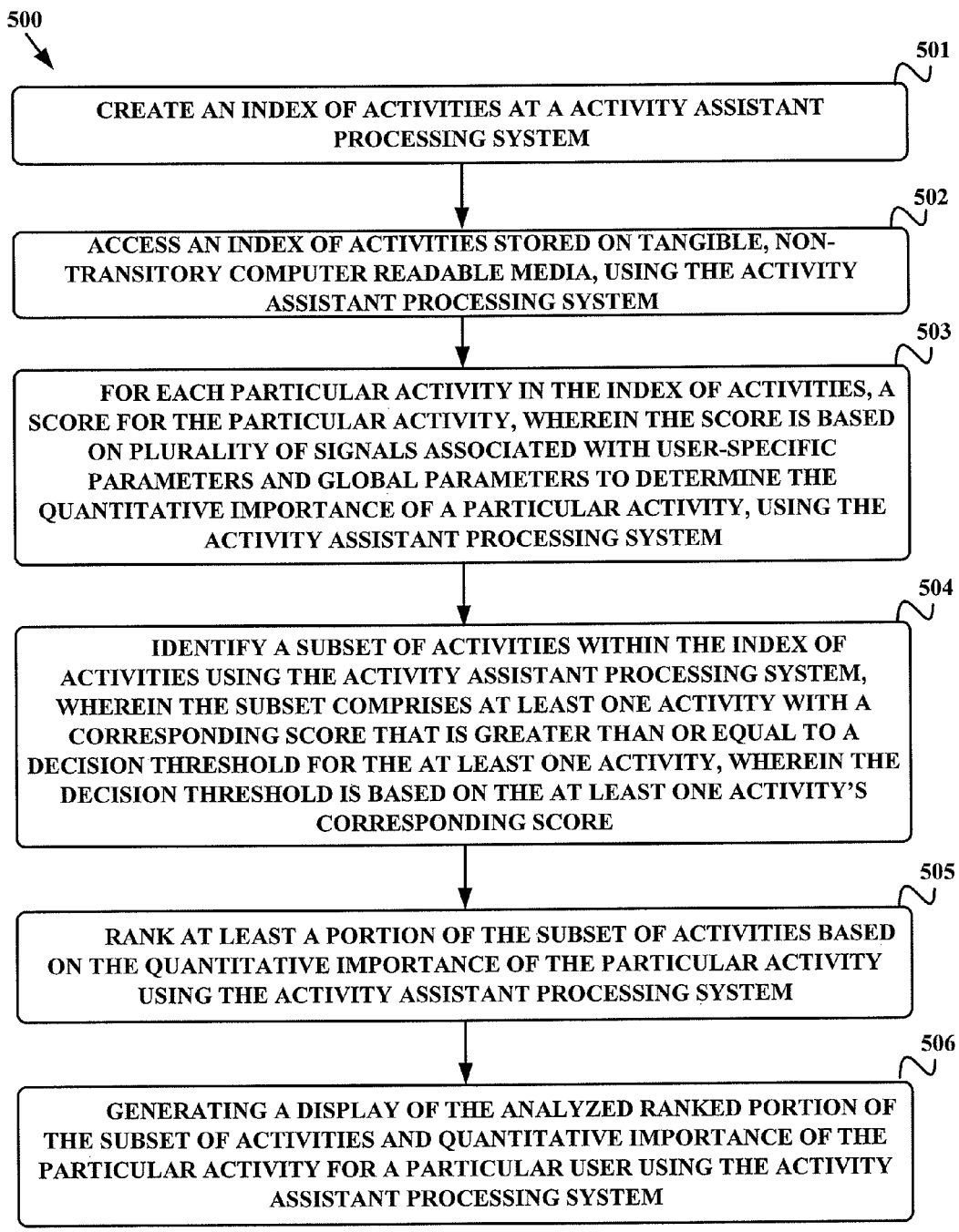
FIG. 5 shows a flowchart chart illustrating a method according to an example implementation.

FIG. 4 is flow chart illustrating a method according to an example implementation. In particular, method 400 is carried out by an activity assistant in order to facilitate dynamic and flexible and activities. For example, activity assistant server 108 and/or user account server 102 of FIG. 1 carry out a method such as method 400 to facilitate dynamic user interaction with activities via an interface such as the activity-assistant user interfaces of FIGS. 3A and 3B.

More specifically, method 400 involves the activity assistant accessing a user-account database and retrieving the one or more account-specific parameters of a selected user account, as shown by block 402. The activity assistant then selects a next activity, as shown by block 404, and accesses a global activity database to retrieve the global parameters of a selected activity, as shown by block 406. Then, for the combination of the selected user account and the selected activity, the activity assistant determines one or more signals based at least in part on the global parameters of the selected activity and the account-specific parameters of the selected user account, as shown by block 408. Also as shown by block 408, each signal provides an indication as to the importance of the selected activity to the selected user account. Accordingly, the activity assistant can then use the determined signals as a basis for determining the importance of the selected activity for the selected user, as shown by block 410. The activity assistant then causes a graphical display to display (or provides for display) one or more of the selected activities in an arrangement that is based at least in part on to the importance of the selected activities relevant to one another.

FIG. 5 is flow chart illustrating a method according to another example implementation. In particular, method 500 is carried out by an activity assistant in order to facilitate dynamic and flexible manipulation of activities in some configurations. For example, activity assistant server 108 and/or user account server 102 of FIG. 1 carry out a method such as method 500 to facilitate dynamic user interaction with activities via an interface such as the activity-assistant user interfaces of FIGS. 3A and 3B.

More specifically, method 500 involves the activity assistant processing system creating an index of activities at an activity assistant processing system, as shown by block 501. In the example implementation described in method 500, the index of activities created by the activity assistant processing system contain both, user-selected activities and activities suggested by the activity assistant, as described below. In some implementations, the index of activities created by the activity assistant processing system may contain only user-selected activities. In other implementations, the index of activities created by the activity assistant processing system contain only activities suggested by the activity assistant.

The activity assistant then accesses the index of activities containing both, user-selected activities and activities suggested by the activity assistant, or in alternative implementations, user-selected activities, or in other alternative implementations activities suggested by the activity assistant, stored on tangible, non-transitory computer readable media, as shown by block 502. For each particular activity in the index of activities the activity assistant processing system next determines a score for the particular activity in which the score is based on plurality of signals associated with user-specific parameters and global parameters to determine the quantitative importance of a particular activity, as shown by block 503, and identify a subset of activities within the index of activities in which the subset includes at least one activity with a corresponding score that is greater than or equal to a decision threshold for the at least one activity in which the decision threshold is based on the at least one activity's corresponding score, as shown in block 504. Then, the activity assistant processing system ranks at least a portion of the subset of activities based on the quantitative importance of the particular activity, as shown in block 505. The activity assistant processing system then displays the analyzed ranked portion of the subset of activities and quantitative importance of the particular activity for a particular user, as shown in block 506. The activity assistant then causes a graphical display to display (or provides for display) one or more of the selected activities in an arrangement that is based at least in part on to the importance of the selected activities relevant to one another.

The activity assistant processing system uses a plurality of signals associated with user-specific parameters and global parameters to determine the quantitative importance of a particular activity for a particular user, and to generate a list of activities that are important to the user at that time, based on that ranking in some configurations. Such signals include, but are not limited to: similarity between user's mood and activity mood; similarity between user's context and activity context requirements/restrictions (e.g. on a desktop computer/mobile phone, on-line/off-line, talking on the phone, driving, walking); distance between user's location and activity location (if available); appropriateness of current weather for an activity (e.g. rainy, sunny, snowy); user-designated priority; due date (or next due date, if recurring); snooze history or pattern for an activity; amount of time task requires; progress of activity (done, active or in-progress); who owns the activity; whether the user received a heads-up; popularity, e.g. number of comments on an activity, number of people who have commented, copied, liked, shared, done, or followed the activity; similarity between user query string and activity text (for search/suggest); and similarity between user query string and names or e-mails of other users in activity (for search/suggest).

For purposes of explanation, signals are classified as either "dynamic" or "static." In particular, "dynamic" signals are those that vary independent of the activity (e.g., user's mood, time of day, weather at the user's location, etc.), whereas "static" signals correspond in some manner to a particular activity (e.g., location of an activity such as eating at a particular restaurant, etc.). For instance, a dynamic signal related to the user's mood (which is independent of an activity) can be utilized to determine one or more activities that are important to the user at a given time. It should be understood that both, dynamic and static signals can be determined based upon one or more user-defined parameters, one or more global parameters, or a combination of one or more user-defined parameters and/or one or more one or more global parameters.

In some implementations, the activity assistant pre-computes a portion of the static signals and then combine them with the dynamic signals in real-time.

Because different signals are measured in different ways and possibly on different scales, in order to combine the static and dynamic signals to provide a good overall ranking for a particular activity for a particular user, the activity assistant uses a probabilistic approach in some configurations. This approach allows combining static and dynamic signals and, under a set of assumptions, calculating the ranking for a particular activity for a particular user.

To quantify the importance of a particular activity for a particular user, the activity assistant uses different approaches, such as, but not limited to, a probabilistic approach in which the activity assistant determines a score for each activity that is indicative of the importance of the activity to a particular user. In some implementations, using the probabilistic approach, the activity assistant determines the value of X (i.e., the score) given the signals A, B, C, Q, s0, and s1:

$$P(X|A,B,C,Q,s0,s1),$$

In the above, "X" is a random variable representing the probability that a particular activity is what a particular user wants to do at a particular time. The variables A, B, and C represent different static signals as described above, while s0 and s1 represent different dynamic signals such as but not limited to mood, location, time, weather, desktop vs. mobile, etc. Thus, the activity assistant determines the score of a particular activity for a particular user by determining the probability that the user wants to do an activity X given that the activity is defined by static signals A, B, and C, the user entered query terms Q (if any), and dynamic signals s0, s1 as described above. Note that while the above calculation is based on three static signals (A, B, and C), the number of static signals considered in determining the score may vary. Similarly, while the above calculation is based on two dynamic signals (s0 and s1), the number of dynamic signals considered in determining the score may also vary.

The variable Q represents a user-provided query term(s) (if any). Such query terms are entered, for example, via a search/add bar 306. In the event that no search query has been entered, the score is determined by determining $P(X|A,B,C,s0,s1)$.

The manner in which $P(X|A,B,C,Q,s0,s1)$ is determined can vary according to the relationships between the signals represented by A, B, C, s0, and s1. For instance, the activity assistant varies the manner in which it determines $P(X|A,B,C,Q,s0,s1)$ based upon whether certain variables are conditionally independent and/or whether certain variables are marginally independent of each other. Other probabilistic relationships can also be considered.

To provide a specific example, take the scenario where A is the activity mood (i.e., a mood defined by a global parameter as being associated with the activity), B is the activity location, C is an activity progress or status indicator, s0 is a given user's mood, and s1 is the given user's location. In one example, the activity assistant applies a Naive Bayes probabilistic model and assumes that A, B, C, and Q are all independent of one another, given X and the dynamic signals s0 and s1. The activity assistant can also assume that the user's location (s1) is conditionally independent of the activity mood (A), given the user's mood (s0). Based on this assumption P(A|X,s0,s1)=P(A|X,s0). Further, the activity assistant can assume that the user's mood (s0) and the user's location (s1) are unrelated signals, which are marginally independent of the activity location (C). This assumption means that P(C|X,s0,s1)=P(C|X). Yet further, the activity assistant can assume that various pieces of information about the activity such as the activity mood (A), the activity location (B), and the activity progress indicator (C), as well as the search query (Q), if present, are marginally independent of one another. This assumption means that P(A,B,C,Q)=P(A)*P(B)*P(C) *P(Q). And as another example, the activity assistant can assume that the probability a user wants to do a particular activity, without knowing any additional information about the activity, given the user's dynamic signals (s0, s1), is the same as the probability a user wants to do the activity. This assumption means that P(X|s0,s1)=P(X).

It should be understood that the above assumptions and conditions made by the activity assistant are provided for example purposes and not intended to be limiting. Assumptions and conditions may vary based upon the types of signals used to determine the score, and the relationships between those signals.

In practice, it may be difficult to directly determine the probability P(X|A,B,C,Q,s0,s1), and thus the activity assistant applies a technique according to Bayes' rule that relates the odds of a first event to a second event, before and after conditioning on a third event. More specifically, the activity assistant applies Bayes' Rule as follows:

$$P(X|A,B,C,Q,s0,s1)=P(A,B,C,Q|X,s0,s1)*P(X|s0,s1)/P(A,B,C,Q)$$

This application of Bayes' rule allows the activity assistant to represent the probabilities in terms of the likelihoods, e.g. probability the user's mood is "fun" given that they want to do a particular activity.

Applying the above to the previous example where A is the activity mood, B is the activity location, C is an activity progress or status indicator, s0 is a given user's mood, and s1 is the given user's location, the activity assistant evaluates P(X|A,B,C,Q,s0,s1) using conditional and marginal independence assumptions as follows:

$$P(X|A,B,C,Q,s0,s1)=P(A|X,s0)*P(B|X,s1)*P(C|X)*P(Q|X)*P(X)/(P(A)*P(B)*P(C)*P(Q))$$

The activity assistant further breaks the parts of the equation as shown above into components for computation as follows:

$$P(X|A,B,C,Q,s0,s1)=P(A|X,s0)/P(A)*P(B|X,s1)/P(B)*P(C|X)/P(C)*P(Q|X)*P(X)/P(Q).$$

When a user search query is present, P(X), P(Q|X), and P(Q) can be regrouped in the above using Bayes' Rule to determine the score as follows:

$$P(X|A,B,C,Q,s0,s1)=P(A|X,s0)/P(A)*P(B|X,s1)/P(B)*P(C|X)/P(C)*P(X|Q)$$

Alternatively, when no search query Q is present, P(X/Q) may be replaced with the P(X). As such, the score can be determined as follows:

$$P(X|A,B,C,Q,s0,s1)=P(A|X,s0)/P(A)*P(B|X,s1)/P(B)*P(C|X)/P(C)*P(X)$$

In a further aspect, when a user inputs a strong signal as a set of query terms, instead of trying to determine the P(X) (e.g. probability of how much the user wants to do an activity independent of any signals), the activity assistant substitutes in the probability that the user was trying to reach activity X using their query terms. The activity assistant estimates the latter by using a similarity measure between the activity text and the query terms normalized on a 0-1 scale.

The activity assistant computes terms such as, for example, P(A|X,s0)/P(A), using different approaches. An example approach involves (i) determining P(A|X,s0) and P(A) from the data; (ii) estimating P(A|X,s0)/P(A) for different values of A and s0; and (iii) using a histogram approach as described below in order to further estimate data indicative of how many of the activities have been done (i.e., completed) for different combinations of A and s0. When the activity assistant determines P(A|X,s0)/P(A), the activity assistant then counts proportions from the data. For example, proportion of activities where a mood signal A takes on the value "fun" when the user marked X "done" and expressed mood s0 for P(A|X,s0), and the proportion of activities that take on value "fun" for P(A). Similar approaches can be used to determine P(B|X,s1)/P(B) and/or P(C|X)/P(C). Furthermore, other approaches and applications of this approach are possible.

In some implementations, for parameters such as mood, a similarity function between the user's setting (e.g. "social" mood) and the mood information for the activity, for example "fun" mood is used to identify related activities in addition to activities with an exact parameter match. For example, a "fun" activity comes up in the list when a user chooses "social" from the context wheel or dropdown menu, though "fun" activities will be ranked lower than the activities that are tagged as "social". In another example, for a "mood" parameter pairings, e.g. "productive" and "lazy", the similarity is zero so a "lazy" activity won't be shown when a user says that he or she is feeling "productive". Similar mechanism are also used for a "time" parameter. For example if the user's time is currently "morning" and an activity is tagged as "afternoon", the activity will get a ranking boost, though it's ranking will still be lower than the ranking for an activity which is tagged "morning".

In some implementations, to alert a user why a particular activity is either ranked higher or lower on the user's list of activities (e.g., based on the particular activity's score), the activity assistant displays the importance of a particular activity for a particular user in a form of "justifications". For example, if an activity is ranked higher because the user's "mood" parameter is "fun" and the activity is "fun", the activity assistant activity displays a label with a word "fun". A similar mechanism is used for the "location" parameter, e.g. "here", "nearby", "2 miles away", "home", and for the "time of day" parameter, such as "weekend", "evening", and "morning". For some parameters, such as but not limited to, location and possibly time, the activity assistant always displays the justification. For other parameters, the activity assistant displays the justifications for a particular activity for a particular user where the activity's score for that parameter (e.g. mood) is a standard deviation in the log space greater than a decision threshold, which is the geometric mean of all the scores for that parameter across a plurality of activities. Furthermore, the activity assistant shows at least one justification for the top three activities on the list for a particular user in some implementations. If, however, none of the activity's score for that parameter meets the decision threshold, the activity assistant displays justifications for activities, where that parameter had the highest contribution to a particular activity's score on the list for a particular user.

In the personalized activity panel 302 of FIG. 3A, the activity assistant provides the user with a list of activities that includes both activities that a user has added and/or suggested activities that a user has not yet added, but which the activity assistant has determined are important to the user. These suggested activities include, for example, activities that have been shared by the user and other activities that are marked public. Suggested activities can also be useful in a number of other scenarios including, as just one example, the display of a suggested activity list 354 in the activity assistant user interface 350.

In personalized activity panel 302, the activity assistant can mix suggested activities into the user's activity list in a way that is helpful but not intrusive to the user's processing of their list. At the same time, mixing of suggested activities into the user's activity list helps the user to identify activities that are relevant to the user's current context. The activity assistant mixes suggested activities into the user's activity list based on the following mechanism in some configurations. The activity assistant obtains a ranking score for all suggested activities and for activities on the user's activity list based on the user's context and a plurality of parameters. The activity assistant orders all the activities based on the ranking score. The activity assistant removes any duplicate activities. If, however, one of the duplicate activities is authored by the user, the activity assistant removes other copies of that activity and keep the activity authored by the user. If an activity occurs more than once in the user's personalized activity panel 302 and none of these activities are authored by the user, the activity assistant removes all the lower-ranked copies and leave the highest ranked copy. The activity assistant samples suggested activities selected to be included into the user's personalized activity panel 302 in order to constrain the proportion of suggested activities relative to the user's activities so that their activities (the ones they have created or copied) are not overwhelmed by the suggestions. The activity assistant rotates or samples the suggested activities based on the following mechanism: (i) dividing a score for each suggested activity by the maximum score on the list of suggested activities (and possibly placing each on a scale between 0 and 1, (ii) for each activity, generating a random number between 0 and 1 and associating the random number with the activity; (iii) comparing the randomly generated number with the normalized score of each suggested activity; and (iv) selecting suggested activities whose normalized score is greater than the randomly generated number to be included into the user's activity list. Based on this mechanism, the activity assistant includes a suggested activity into the user's activity list if it ranks higher on the user's list given the activity's context. The activity assistant balances the number of suggestions against the number of activities on the user's activities list before displaying in the personalized activity panel 302. The activity assistant increases or decreases the number of suggested activities to be included into the user's activity list based on the following mechanism: (i) setting an upper limit on the number of suggested activities to be included into the user's activity list as a percentage of the entire list of activities (e.g. a maximum of 20% of the list should be suggestions); (ii) changing the percentage depending on the user's mood; for example, if the user is feeling ambitious, the activity assistant sets a higher percentage (e.g. 30%); if the user is feeling productive, which likely indicates that the user wants to complete his or her activities, the activity assistant sets a lower percentage (e.g. 5%). If, however, there are too many suggested activities, the activity assistant reduces the percentage of the suggested activities by randomly removing the suggested activities until the target percentage number is reached. In the alternative, if there are too few suggested activities, the activity assistant increases the percentage of the suggested activities by randomly adding the suggested activities until the target percentage number is reached. Further, the activity assistant defines a lower limit on the number of suggested activities to be included into the user's activity list so that the user always has at least 10 activities, including suggestions, in his or hers activity list.

The activity assistant processing system uses an automated ranking function that takes into account a plurality of signals associated with user-specific parameters and global parameters as described above to determine the quantitative importance of a particular activity for a particular user and to generate a list of activities based on that ranking that a particular user should or should not do in a particular situation.

The activity assistant ranks the activities in the user's personalized activity panel 302 based on the activities' scores in some configurations. In the example implementation, the activity assistant uses the "My Activity Ranker", which generates and displays a list of user's activities in the user's main list on the left side of the main screen on desktop or the main screen on mobile and the "Query Activities Ranker", which provides a list of ranked activities in response to the user's entry of text into the search/new activity function on the activity assistant user interface or on mobile device to rank the users activities as well as "suggested" activities or activities not owned by the user and further ranks the activities based on creation date, from newest to oldest. The activity assistant uses the rankers to compute the scores as a combination of probability factors, according to the models described above.

The activity assistant uses the "My Activities" ranker to combine various signals to generate a single ranking score for each activity, given the user's context signals (mood, location, time of day, date, and in the future other signals such as weather, etc.) in some configurations. The activity assistant uses these scores to order the activities that a user sees in his or hers "my activities" page on the activity assistant user interface or mobile device.

The activity assistant uses the "My Activities" ranker to order a particular user's activities for the "my activities" page and set the threshold based on activity's scores to remove activities that score too low from a particular user's list of activities in some configurations.

The "My Activities" ranker uses different models, such as but not limited to a Naive Bayes model, incorporating several signals that includes signals that corresponding to the user-specific and global parameters (e.g., mood, location, time) and "static" signals that are stored in the activity assistant's database (e.g., activity progress, number of comments, time since creating).

The activity assistant uses the "My Activities" ranker to remove activities from the list of activities when sampling, as described below, generates too few or too many suggestions or activities to be included on a particular user's list of activities in some configurations.

The activity assistant uses the "Query Activities" ranker when a user is entering information into the search/new activity function on the activity assistant user interface or on mobile device, either to add an activity or to search for an activity in some configurations.

The "Query Activities" ranker does not take into account signals associated with user-specific and/or global parameters (e.g., mood, time, location) under the assumption that the user is possibly looking up an activity or entering information for a future context. The "Query Activities" ranker uses "static" signals that are stored in the activity assistant's database (e.g., activity progress, number of comments, time since creating).

The activity assistant uses the "Query Activities" ranker when the user is performing a query in the activity assistant user interface. The "Query Activities" ranker may not include modules that rank and filter activities based on signals associated with the user-specific and/or global parameters, such as mood, time, and location, but uses the Query Token Prior module (as described below) as well as the "static" modules such as popularity and ownership. The "Query Activities" ranker may leave out the progress module to support reminders of activities the user has done before that they may want to repeat.

The activity assistant uses the "Query Activities" ranker to rank the activities using several signals, including ownership and popularity; however, the "Query Activities" ranker does not apply a threshold to the list of activities.

In some implementations, the activity assistant uses the following modules, based on signals described above, to determine the probability factors: (i) Location Likelihood Module; (ii) Mood Likelihood Module; (iii) Popularity Likelihood Module; (iv) Progress Likelihood Module; (v) Query Token Prior module; (vi) Activity Owner Likelihood; (vii) Activity Prior Module; (viii) Time Likelihood module; and (ix) Schedule Snooze Likelihood module. It should be understood that the activity assistant processing system uses a histogram model described below in every module to determine the probability factors.

In some implementations, the activity assistant multiplies the probability factors determined in each of the modules to give the ranking score for a particular activity.

The activity assistant uses the Location Likelihood module to determine the probability that a particular activity is what a particular user wants to do at a particular location, $P(A|X,s0)/P(A)$, where A represents a random variable over the distance between the user and the location in the activity. The determination of this probability implicitly depends on the signal associated with the global parameter such as user's location. Depending on the signal associated with the global parameter such as, for example, user's location, the activity assistant uses different models for determining $P(A|X,s0)/P(A)$, such as but not limited to: (i) Model 1, which is used when the signal associated with the location parameter indicates that the user doesn't want to see activities ranked by location; (ii) Model 2, is used when the signal associated with the location parameter, such as the user's home, indicates the exact location given in the user's profile; and (iii) Model 3, which is used when the signal associated with the location parameter indicates that the user is at some other location expressed as a latitude/longitude. It should be understood that the activity assistant uses other models for determining $P(A|X,s0)/P(A)$ in some configurations and still be within the scope of the subject technology.

When using Model 1 that does not have a signal associated with the global parameter, such as for example, a user's location, the activity assistant assigns a constant probability to all activities determined by this model. When using Models 2 and 3, the activity assistant uses a variant of the histogram-based approach also used in the Time Likelihood module described below and encapsulated in the Histogram Model.

In general, a histogram model is used in creation and evaluation of histograms for the $P(A|X)/P(A)$ probability determined by the Location Likelihood module. First, an array of the weights is created for each of the histogram buckets; these are the probabilities that a particular user would do an activity from that bucket.

For each activity, the activity assistant computes $P(A|X)/P(A)$, where A can take on the index of the different histogram buckets in some configurations. The activity assistant takes from a user weights for the buckets that signify the probability that a user will do an activity in that bucket. The activity assistant determines the conditional probability $P(A|X)$ using the counts in the buckets and the weights, and determines the marginal probability $P(A)$ using just the counts in the buckets. For example, if there are four buckets and the counts in the buckets are A, B, C, and D and that the weights on these buckets are a, b, c, and d, respectively, than $P(A|X)$ for the A bucket is:

$$a*A/(a*A+b*B+c*C+d*D).$$

Similarly, the value for the B bucket is:

$$b*B/(a*A+b*B+c*C+d*D).$$

The marginal probability for A is the percentage of items in bucket A, or $A/(A+B+C+D)$. Starting from the ratio of the probabilities as expressed above for the A bucket:

$$(a*A/(a*A+b*B+c*C+d*D))/(A/(A+B+C+D))=(a*A*(A+B+C+D))/(A*(a*A+b*B+c*C+d*D))=a*(A+B+C+D)/(a*A+b*B+c*C+d*D)=a*RATIO,$$

where RATIO is the same for all buckets. Thus, in the end, the weight on the bucket is the important factor for differentiating the activities from one another, and the RATIO that is applied to each activity essentially acts as a normalization factor to assist in determining the final score for a particular activity.

In some implementations, the activity assistant may not set up boundaries for discrete buckets in the Location Likelihood module. Instead the activity assistant may use a continuous function to give the weights for the buckets and report the activities to the Histogram Model as though each activity is in its own infinitely small bucket.

The activity assistant classifies the activity in one of the following ways: (i) the activity is marked as something done at home; (ii) the activity is marked as being relevant to a specific latitude/longitude; and (iii) the activity is marked as not being location-specific.

When a user indicates that he or she wants activities for "anywhere", in some implementations, the activity assistant returns activities with probability of 1.0 regardless of what is in the activity in some configurations. For example, when the user is at specifies latitude/longitude and the activity is an "anywhere" activity, activity assistant uses a bucket weight given by "Anywhere Activity" weight.

In another example, if the activity specified by the user has a latitude/longitude associated with it, activity assistant computes a bucket weight based on the distance between the user's latitude/longitude and the activities' latitude/longitude using, for example but not limited to, modified version of the Gaussian complementary cumulative distribution function (CCDF).

In yet another example, if the activity specified by the user is an at-home activity, activity assistant takes the signal corresponding to a global parameter such as latitude/longitude of home and perform the same distance computation as above.

When the user is at home and the activity is "anywhere" the activity assistant uses a constant weight given by "Anywhere Activity" weight. In the alternative, if the activity is marked as at-home, the activity assistant determines a probability of 1.0 and if the activity is marked with a latitude/longitude, the activity assistant uses the distance calculation used in the case where the user has specified a latitude/longitude.

In the case where the user specifies "anywhere" activity, the activity assistant may not provide an explanations for any activities. If the activity is tagged as "home", the activity assistant always provide "home" as the explanation in some configurations. If the activity is labeled with a latitude/longitude, the activity assistant provides the distance between the user's location (whether home or arbitrary latitude/longitude) and the location of the activity.

The activity assistant uses Mood Likelihood module to determine $P(A|X,s0)/P(A)$ for the mood parameter, which is the probability that activity X is tagged as mood A given that the user wants to do Activity X now, normalized by the marginal probability that an activity is tagged as mood A in some configurations. To determine P(A|X,s0)/P(A), the activity assistant uses a histogram model over the list of activities where activities are put into buckets according to their signals from the mood parameter. Each bucket is weighted by the probability that a user will do an activity in that bucket. Implicit but not explicitly expressed in the probability terms is a conditional dependency on the user's mood, which comes as a signal from the user. This is used to do model selection, which in this case means the activity assistant uses a different set of weights for the buckets depending on the user's mood.

In some implementations, the mood parameters are correlated with one another in the Mood Likelihood module. For example, if the user says that he or she is feeling "social", the activity assistant ranks activities tagged as "social" with the highest ranking, but activities tagged as "fun" also get a high rating. Activities tagged as "lazy" are ranked lower and activities tagged as "productive" are ranked the lowest. The effect in the ranking algorithm is that, when a user says that he or she is feeling "social", the activity assistant determines a mixture of activities that are mostly fun and social.

The activity assistant uses the Popularity Likelihood module to determine P(A|X, isPublic)/P(A|isPublic), which is the probability that activity X has popularity score A given that the user wants to do activity X now and the private/public state of the activity, normalized by the marginal probability that an activity has popularity score A given its public/private state in some configurations.

To compute P(A|X, isPublic)/P(A|isPublic), the activity assistant uses a histogram model over the indexed set of activities where activities are put into buckets according to their time-dampened popularity scores. Each bucket is weighted by the probability that a user will do an activity in that bucket.

It should be understood that in some implementations the popularity score for an activity combines several popularity signals associated with popularity parameters, such as but not limited to: (i) number of copies of that activity; (ii) number of copies that were done; (iii) number of comments on that activity; and (iv) number of heads-ups, possibly normalized by the number of people who sent those heads-ups (to measure how popular an activity is). In other implementations, when determining the popularity score, the activity assistant processing system attenuates each of these signals associated with popularity parameters, as described above, by a factor based on the time elapsed since the signals were last updated. The activity assistant uses the time-attenuation to account for trends and transients. The activity assistant uses an exponential fall-off factor that reduces the popularity score for an activity by, for example, (i) 56% after 1 week, (ii) 70% after 2 weeks, and (iii) 90% after 4 weeks. Using positive weights the activity assistant linearly combines all the time-attenuated signals to determine the popularity score.

The public or private status of an activity introduces a significant bias in the popularity score. Because private activities are, in general, visible to fewer people, they may tend to also be less popular. The activity assistant, therefore, uses separate distribution parameters for private activities in some configurations.

The activity assistant uses a Progress Likelihood module to determine P(A|X,s0)/P(A) for a progress signal, which is the probability that an activity is in progress state A in the set of "open, in-progress, done, and inactive" states given a user wants to do activity X now.

In some implementations, the activity assistant only determines that an activity is in "done" versus all other progress states. Furthermore, the activity assistant uses the pattern of the progress history over time to determine a particular user's behavior and preferences. For example, if an activity is done repeatedly, as the time gets closer to when the activity assistant would expect the user to do the activity again, then the activity assistant reduces the negative effect of the "done" signal so that the activity begins to percolate up the user's ranked list so that the activity acts more and more like something that hasn't been done before as the time to do this activity again approaches.

The activity assistant uses the Query Token Prior module in the query activity ranker to determine P(X|Q) for each of the activities, which is the probability that the user wants to do activity X now given the string of query tokens he or she provided through the activity assistant user interface or mobile device (e.g., when the user is in "suggest" mode) in some configurations.

The activity assistant determines the factor for each activity in the list of activities. The activity assistant preserves the previous user behavior by providing an alphabetical ordering of the activities. The activity assistant sets the probabilities to span a relatively small range so that if there is another filtering signal from the user-specific parameter (e.g., mood), that signal will take precedent over the alphabetical signal. The activity assistant increases the strength (by increasing the range) of the probability factor determined by the Query Token Prior module when the activity assistant is returning a signal other than an alphabetical sorting signal.

In some implementations, the activity assistant detects the similarity between the search terms and the activity text (and possibly comments) by counting the number of shared words or the proportion of shared words, after some normalization of the words, such as stemming, which removes suffixes and verb endings (-ing, -ed, -es, etc).

The activity assistant uses an Activity Owner Likelihood module to determine P(A|X,s0)/P(A) based on activity ownership and shared-with signal, which is the probability that activity X is owned by user A (or shared with the current user) given that the current user wants to do activity X now, normalized by the marginal probability that an activity would be owned by A in some configurations. The activity assistant uses a histogram model over the indexed set of activities. The buckets of the histogram correspond to activities that: (i) belong to the current user; (ii) belong to one of the user's friends; and (iii) belong to some other user.

In some implementations, the activity assistant user interface includes a display feature showing that ownership was a reason an activity was suggested.

The activity assistant uses the Activity Prior Module to determine prior probability used by the "My Activities" ranker in some configurations. This is the probability that a user will want to do an activity, without knowledge of any of the other signals corresponding to either user-specific or global parameters.

The activity assistant determines P(X), the prior probability that the user wants to do activity X now. This encapsulates any knowledge about the user's preference for activities that are not affected by "dynamic" signals or most "static" signals described above.

In some implementations, the activity assistant uses a gamma probability distribution over the number of days since the activity was created. The probability value is multiplied by a scaling factor in order to control the influence of this prior activity in the determination of the score for an activity.

The activity assistant use the Time Likelihood module to determine $P(A|X,s0)/P(A)$ where A represents a random variable over the time properties of the Activities in some configurations. The activity assistant uses different functions to determine $P(A|X,s0)/P(A)$ factor for the time likelihood module. For example, the activity assistant uses the Computer Factors function to determine the factor for each activity in the list of activities depending upon the type of the user time query. For example, if the signal associated with the user-specified parameter does not provide a valid time tag, the activity assistant uses the Computer factors function to assign a factor of 1.0 to every activity. In another example, if the signal associated with the user-specified parameter provides one of the string-based time tags, such as but not limited to "weeknight" or "weekend", the activity assistant performs a hard filter based on the text of the tags and may avoid the reasoning that uses day-of-week and hour-of-day. In yet another example, if the signal associated with the user-specified parameter provides a time stamp, the activity assistant converts the activity tags into day-of-week and hour-of-day intervals and computes a probability based on a distance function to the next occurrence of the activity's intervals.

Depending on the time signal the activity assistant applies different models, such as but not limited to a no-tag model, which can be used when the signal associated with the user-specified parameter has no time tag; a weekend model, which can be used when the signal associated with the user-specified parameter specifies "weekend"; a weeknight model, which can be used when the signal specifies "weeknight"; or a Time Distance model, which can be used when the signal associated with the user-specified parameter provides a specific date and time. In some implementations, the activity assistant can assign a factor of 1 for all activities determined by the no-tag model. In other implementations, the activity assistant can use a histogram-based approach that determines the factors using the counts in the buckets for models utilizing signals that contain time tags. In the histogram-based approach for models utilizing signals that contain time tags each bucket has a probability that indicates how likely a user is to do an activity given its time properties.

In some implementations, when a user indicates that he or she wants weekend activities, the activity assistant uses the weekend model and applies a histogram model that uses use three buckets, such as but not limited to: (i) activities labeled "weekend", (ii) activities labeled "weekday", and (iii) activities with other or no labels. In other implementations, when a user indicates that he or she wants weeknight activities, the activity assistant uses the weeknight model and applies a histogram model that uses five buckets, such as but not limited to: (i) activity labeled "weekday" and "evening" or labeled "weekday" and "night"; (ii) activity labeled "weekend"; (iii) activity labeled "evening" or "night" (but not "weekday" or "weekend"); (iv) activity labeled with some other time of day; (v) activity does not have a tag. In further implementations, when the signal associated with the user-specified parameter has provided a reference time (converted into day-of-week and hour-of-day), the activity assistant uses the Apply Time Distance model to determine the distance in hours to each of the activity intervals and applies a histogram model over these hour distances using coarse buckets taking into consideration that most hour intervals are about 4 hours long: (i) within 2 hours; (ii) 3-4 hours; (iii) 5-8 hours; (iv) 9-12 hours; (v) 13-24 hours; (vi) more than 24 hours; and (vii) not tagged with time. The activity assistant provides the name of the interval that was closest to the user's reference time.

The activity assistant uses the Schedule Snooze Likelihood module to determine $P(A|X, s0)/P(A)$ probability that captures the schedule and snooze actions a user has taken (with s0 being a dynamic time-related signal, such as the current time when ranking is being performed) in some configurations. "Scheduling" is meant to encompass those actions where a user is indicating that they want to do something (or have it ranked high in their personalized activity panel) by a particular time. For example, "tomorrow", "next week", a specific date (e.g. Jan. 1, 2011), or "ASAP", which means the activity should be scheduled with the highest urgency regardless of today's date. "Snoozing" is meant to encompass those actions where a user wants to put the activity off or get the activity out of their view. For example, "later", "someday" (essentially indefinitely, but keep it around), "next month". With "Scheduling", the activity assistant stores and uses in the ranking the most recent scheduling action, whereas with "Snoozing", the activity assistant stores and uses the history of snoozing actions. For example, if a user has snoozed something for "later" three times in a row each time a couple days apart then the activity assistant starts snoozing this activity for longer than just a couple of days. In the alternative, if a user has been consistently procrastinating on an activity, the activity assistant suggests that the user snoozes the activity for "someday" and looks the activity up when he or she want to do the activity.

With respect to any or all of the block diagrams and flow charts in the figures as discussed herein, each block and/or communication represents a processing of information and/or a transmission of information in accordance with example implementations. Alternative implementations are included within the scope of these example implementations. In these alternative implementations, for example, functions described as blocks, transmissions, communications, requests, responses, and/or message may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

It should be understood that for situations in which the systems and methods discussed herein collect personal information about users, in some implementations, the users may be provided with an opportunity to opt in/out of programs or features that may collect personal information (e.g., information about a user's preferences or a user's contributions to social content providers). In addition, in some implementations, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various aspects and implementations have been disclosed herein, other aspects and implementations will be apparent to those skilled in the art. The various aspects and implementations disclosed herein are for purposes of illustration and are not intended to be limiting.

What is claimed is:

1. A computer-implemented method comprising: for a particular activity in a group of activities, determining a score for the particular activity, wherein the score is based on a plurality of signals associated with a plurality of parameters comprising one or more user-specific parameters and one or more global parameters, and the score represents a quantitative importance of the particular activity, the one or more user-specific parameters comprising a mood of a user as indicated by the user, the one or more global parameters comprising a mood associated with the particular activity, the plurality of signals comprising a signal based on a similarity between the mood of the user and the mood associated with the particular activity, and the group of activities includes one or more activities added by the user group of activities and one or more activities suggested for the user;
   identifying a subset of activities within the group of activities, wherein the subset comprises at least one activity with a determined score that satisfies a decision threshold for the at least one activity;
   ranking at least a portion of the subset of activities based on the scores of the activities relative to one another; and
   providing for display the ranked portion of the subset of activities for the user,
   wherein a ratio of a number of the suggested activities in the ranked portion of activities that are provided for display to a number of the user-added activities in the ranked portion of activities that are provided for display is based on the mood of the user.

2. The method of claim 1, wherein the decision threshold is based on a corresponding score of the at least one activity.

3. The method of claim 1, wherein the decision threshold comprises a geometric mean of all scores for a respective parameter across a plurality of activities.

4. The method of claim 1, wherein:
   the ranked portion of the subset of activities comprises at least one user-selected activity among the one or more user-selected activities and at least one suggested activity among the one or more suggested activities, and
   the providing for display comprises providing for display the ranked portion of the subset of activities so as to visually differentiate between the at least one user-selected activity and the at least one suggested activity.

5. The method of claim 1, wherein the plurality of signals includes a signal based on a similarity between a user's context and activity context requirements.

6. The method of claim 1, wherein the plurality of signals includes a signal based on a distance between a user's location and an activity location.

7. The method of claim 1, wherein the plurality of signals includes a signal based on current weather for an activity.

8. The method of claim 1, wherein each of the plurality of signals is classified as a dynamic or static signal.

9. The method of claim 8, wherein the dynamic signal is a signal that varies independent of a respective activity from the group of activities.

10. The method of claim 8, wherein the static signal corresponds to a respective activity from the group of activities.

11. The method of claim 8, wherein determining the score for the particular activity is based on one or more static signals and one or more dynamic signals.

12. The method of claim 10, wherein determining the score for the particular activity is further based on one or more query terms.

13. The method of claim 10, wherein determining the score for the particular activity is further based on a Naive Bayes probabilistic model.

14. The method of claim 1, wherein ranking at least a portion of the subset of activities based on the scores of the activities relative to one another further comprises:
   removing duplicate activities from the ranked portion of the subset of activities.

15. The method of claim 1, wherein ranking at least a portion of the subset of activities based on the scores of the activities relative to one another further comprises:
   setting an upper limit on a number of ranked activities as a percentage of the activities.

16. A system comprising:
   a non-transitory computer-readable medium comprising a group of activities; and
   program instructions stored on the non-transitory computer-readable medium and executable by an activity assistant processing system to:
      access the group of activities, wherein the group of activities includes one or more activities added by a user to the group of activities and one or more activities suggested for the user;
      for each particular activity in the group of activities, determine a score for the particular activity, wherein the score is based on at least one signal associated with a plurality of parameters comprising one or more user-specific parameters of the user and one or more global parameters, the one or more user-specific parameters comprising a mood of the user as indicated by the user, the one or more global parameters comprising a mood associated with the particular activity, and the plurality of signals comprising a signal based on a similarity between the mood of tire user and the mood associated with the particular activity;
      identify a subset of activities within the group of activities, wherein the subset comprises at least one activity with a determined score that is greater than or equal to a decision threshold for the at least one activity;
      rank at least a portion of the subset of activities based on the relative scores of the activities in the subset; and
      provide for display the ranked portion of tile subset of activities for the user, wherein a ratio of a number of the suggested activities in tile ranked portion of activities to be provided for display to a number of the user-added activities in the ranked portion of activities to be provided for display is based on the mood of the user.

17. The system of claim 16, wherein the decision threshold is based on the corresponding score of the at least one activity.

18. The system of claim 16, wherein the decision threshold comprises a geometric mean of all scores for a respective parameter across a plurality of activities.

19. An article of manufacture including a tangible computer-readable media having computer-readable instructions encoded thereon, which when executed by a machine, cause the machine to perform operations comprising:
   creating a group of activities, wherein tile group of activities includes one or more activities added by a user to the group of activities and one or more activities suggested for the user;
   accessing the group of activities stored on tangible, non-transitory computer readable media;
   for each particular activity in the group of activities, determining a score for the particular activity, wherein the score is based on a plurality of signals associated with user-specific parameters and global parameters to determine quantitative importance of the particular activity, the one or more user-specific parameters comprising a mood of the user as indicated by the user, the one or more global parameters comprising a mood associated with the particular activity, and the plurality of signals comprising a signal based on a similarity between the mood of the user and the mood associated with the particular activity;
   identifying a subset of activities within the group of activities, wherein the subset comprises at least one activity with a determined score that is greater than or equal to a decision threshold for the at least one activity;
   ranking at least a portion of the subset of activities based on the quantitative importance of the activity; and
   generating a display of the ranked portion of the subset of activities and the quantitative importance of the particular activity for the user,
   wherein a ratio of a number of the suggested activities in the ranked portion of activities to be generated on the display to a number of the user-added activities in the ranked portion of activities to be generated on the display is based on the mood of the user.

20. The article of manufacture of claim 19, wherein the decision threshold is based on the corresponding score of the at least one activity.

21. The article of manufacture of claim 19, wherein the decision threshold comprises a geometric mean of all scores for a respective parameter across a plurality of activities.

22. The method of claim 1, further comprising providing for display, for at least one activity in the ranked portion of the subset of activities; a label corresponding to a parameter among the plurality of parameters utilized in the ranking of the at least one activity.

23. The method of claim 11, further comprising:
   setting, based on the mood of the user, an upper limit on the number of the suggested activities in the ranked portion that are provided for display as a percentage of a total number of activities in the ranked portion that are provided for display.

* * * * *